J. D. JONES.
Horse Rake.

No. 47,644.

Patented May 9, 1865.

Witnesses:
James J. Johnston
Alexander Hays

Inventor:
James D. Jones

UNITED STATES PATENT OFFICE.

JAMES D. JONES, OF PITTSBURG, PENNSYLVANIA.

IMPROVEMENT IN HORSE-RAKES.

Specification forming part of Letters Patent No. 47,644, dated May 9, 1865.

*To all whom it may concern:*

Be it known that I, JAMES D. JONES, of Pittsburg, in the county of Allegheny and State of Pennsylvania, have invented certain new and useful Improvements in Horse-Rakes; and I do hereby declare that the following is a full and exact description thereof, reference being had to the accompanying drawings, and to the letters of reference marked thereon.

The nature of my invention consists in constructing and arranging the several parts in the manner hereinafter described.

To enable others skilled in the art of constructing horse-rakes to make and use my invention, I will proceed to describe its construction and operation.

Figure 1:
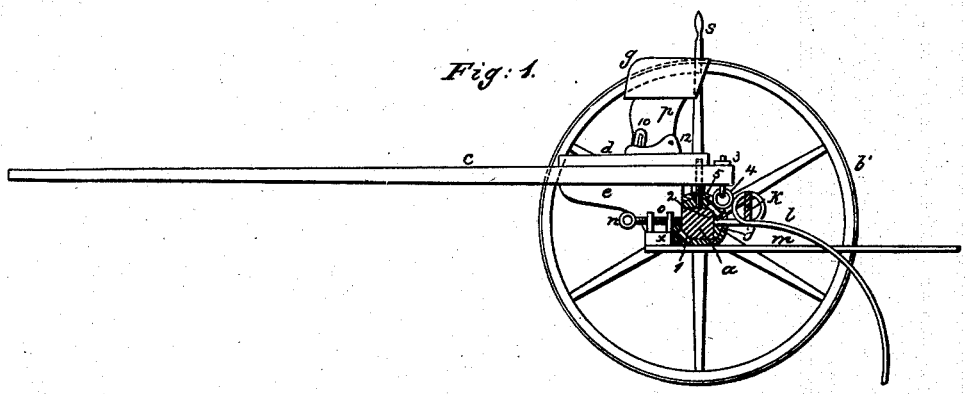
Figure 2:
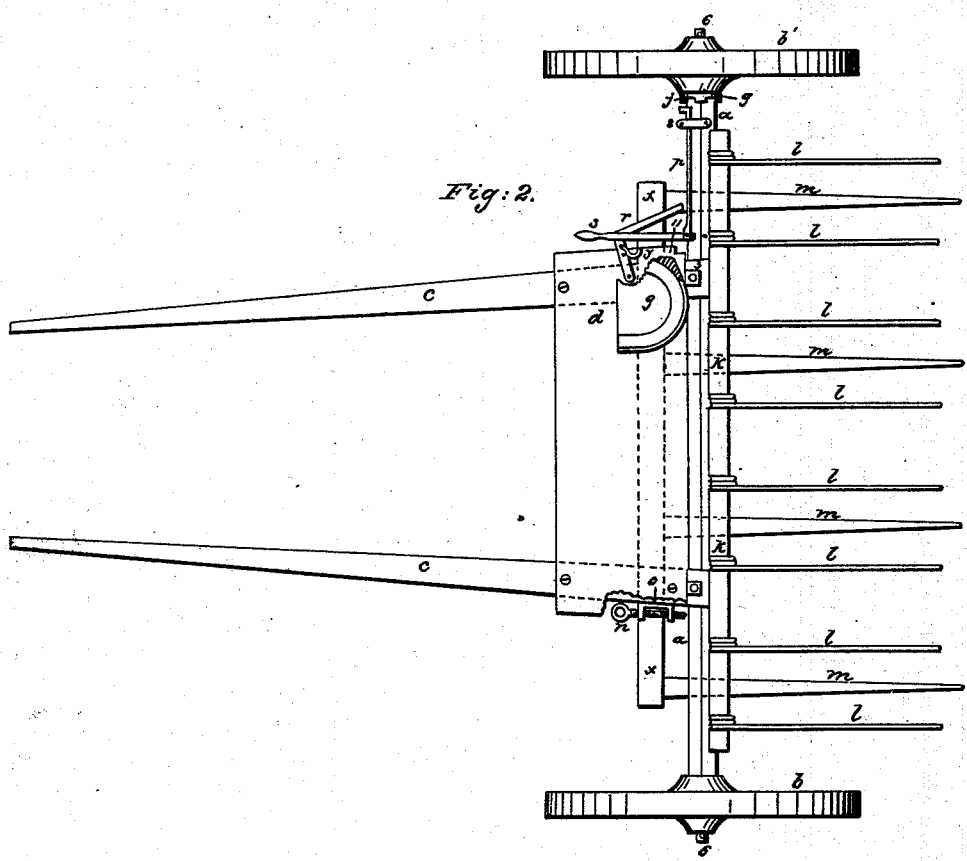

In the accompanying drawings, Figure 1 represents a side and sectional view of my improved horse-rake. Fig. 2 represents a top view of the same.

The size, form, and mode of constructing the various parts which make up the horse-rake I leave to the skill and good judgment of the mechanic, and confine myself in the description to the arrangement and use of the various parts which go to make up my improved rake.

In the drawings, $a$ represents the axle, to which the teeth $l$ are attached.

$b$ and $b'$ represent the wheels. On the inner end of the wheel $b'$ is placed a ratchet, $j$.

$s$ and $t$ represent levers which are secured to and in the axle $a$, lever $t$ being attached to lever $s$ at one end, and the other end being held in line with axle $a$ by means of a guide, (marked 8,) which is secured to the axle.

$c$ represents the thills, which are attached to the axle by means of links 4 and 5 and nuts 1, 2, and 3. On the under side, near the back end of the thills, are blocks, (marked $e$.) To these blocks is attached a cross-piece, (marked $x$,) to which are attached fingers $m$, which are used for clearing the teeth from the hay when elevating them.

$k$ represents the cross-bar, placed in the spring-coil of the teeth, and is used for holding them apart and in their true position.

To the blocks $e$, on the under side of the thills, are attached screw-nuts $o$, in which are placed the adjustable screws, (marked $n$.) These screws are used for adjusting the distance between the point of the teeth and the ground. If it is desired to increase the distance between the points of the teeth and the ground, then the screws $n$ are forced in the nuts $o$ and against the axle $a$ until the desired distance is obtained, and when the distance between the points of the teeth and the ground is to be made less then the screws $n$ are forced out from the axle $a$. By this arrangement of the adjustable screws $n$ in connection with the axle $a$ and teeth $l$, the distance between the points of the teeth and the ground can be fixed at any desired point and be positive in their action, which is very desirable in hay-making in fields where the ground is wet, on account of which it is desirable to skim over the top of the hay and gather only that part which is dry. This arrangement will also be very desirable and valuable in the prairie country, where they are required to skim over the surface of the cut grass at different depths, in order to obtain a good article of hay; hence it is very desirable to have some means for regulating the distance between the points of the teeth and the ground, and have the action of the teeth in relation to the desired distance positive, and without regard to the weight of the driver or the inequality of the surface over which the rake has to pass.

On the upper side of the thills is placed a platform, (marked $d$,) to which is secured pieces, (marked 12,) which are furnished with slotted lugs, (marked 10.) To the pieces 12 are hinged the legs $r$ of the seat $s$. Near the front edge of the legs $r$ are placed pins, which move in the slots of the lugs. These lugs and the pins which work in their slots are used for preventing the seat from swinging back too far. On one side of the back of the seat is placed a ratchet for holding the lever $s$ in the desired position for holding the teeth in a fixed position. On the platform $d$ is secured a lever, (marked $r$,) which is used for unshipping the levers $s$ and $t$ from the ratchet $j$ when the teeth have been elevated. To the lever $r$ is attached a hook, $y$, which is used for the purpose of holding the lever $s$ down, and thereby holding the teeth $l$ in an elevated position, which is desirable in passing to and from the field.

When I desire to increase the leverage of the thills so that the axle will turn with more ease in elevating the teeth, I lengthen the link 5 by unscrewing the nut 1 and screw up the nut 2, and when I desire to diminish the leverage of the thills in turning the axle I unscrew nut 2 and screw up nut 1, which shortens the link. This arrangement for increasing and diminishing the leverage of the thills in turning the axle for elevating the teeth is a very desirable thing, for the parts will then be made to work in harmony with the work to be performed by the teeth.

It will readily be seen that it will require more power to elevate teeth when the hay is heavy than it will when the hay is light.

The operation of my improvement is as follows: Having all things arranged as herein described and represented, and the various parts adjusted in accordance with the work to be performed, the operator places the lever $s$ in one of the notches of the ratchet 11 and leans back in his seat. This will hold down the teeth $l$, and when they have gathered the desired quantity of hay he unships the lever $s$ from the ratchet 11 and forces the end of lever $t$ into one of the notches 9 of the ratchet $j$, and the motion of the wheels and the draft of the horse on the thills will turn the axle, which will elevate the teeth and bring the lever $s$ in contact with the incline of lever $r$, and unship lever $t$ from the ratchet $j$, which will allow the axle to turn back and bring the teeth $l$ to their work.

6 represents the ordinary iron points for axles.

Having thus described the nature, construction, and operation of my improvement, what I claim as of my invention is—

The arrangement of the flexible seat $g$, levers $r$, $s$, and $t$, ratchets 11 and $j$, adjustable set-screw $n$, regulating-link 5, axle $a$, wheels $b$ and $b'$, and teeth $l$, the whole being constructed, arranged, and operating substantially as and in the manner herein described, and for the purpose set forth.

JAMES D. JONES.

Witnesses:
   JAMES J. JOHNSTON,
   ALEXANDER HAYS.